US008232861B2

(12) United States Patent
Tsou

(10) Patent No.: US 8,232,861 B2
(45) Date of Patent: Jul. 31, 2012

(54) REMOTE CONTROLLER CAPABLE OF SELECTIVELY CONTROLLING A PLURALITY OF ELECTRIC APPLIANCES, REMOTE CONTROL SYSTEM AND METHOD THEREOF

(75) Inventor: Hsien-Chun Tsou, Tao-Yuan Hsien (TW)

(73) Assignee: Watonga Technology, Inc., Carson City, NV (US)

( * ) Notice: Subject to any disclaimer, the term of this patent is extended or adjusted under 35 U.S.C. 154(b) by 1211 days.

(21) Appl. No.: 10/908,777

(22) Filed: May 25, 2005

(65) Prior Publication Data
US 2006/0103545 A1 May 18, 2006

(30) Foreign Application Priority Data
Nov. 18, 2004 (TW) .............................. 93135490 A

(51) Int. Cl.
*G05B 19/00* (2006.01)
*G06F 7/00* (2006.01)
*H04B 1/00* (2006.01)
*H04L 9/14* (2006.01)

(52) U.S. Cl. ..................... 340/5.25; 340/5.64; 340/5.72; 340/5.23; 340/5.21

(58) Field of Classification Search .................. 340/5.25, 340/5.64, 5.72, 825.19, 825.72, 5.23, 5.21; 710/5, 15, 72; 348/734; 307/11, 38, 40
See application file for complete search history.

(56) References Cited

U.S. PATENT DOCUMENTS

| 5,033,085 | A | * | 7/1991 | Rew ............................... 380/241 |
| 5,046,125 | A | * | 9/1991 | Takizawa ........................ 455/411 |
| 5,086,385 | A | * | 2/1992 | Launey et al. .................... 700/83 |
| 5,212,487 | A | * | 5/1993 | Lee et al. ......................... 341/176 |
| 5,473,318 | A | * | 12/1995 | Martel ............................ 340/5.23 |
| 5,815,086 | A | * | 9/1998 | Ivie et al. ....................... 340/825.52 |
| 5,854,594 | A | * | 12/1998 | Lin et al. ........................ 340/825.72 |
| 5,909,183 | A | * | 6/1999 | Borgstahl et al. ............... 340/825.22 |
| 6,549,143 | B1 | * | 4/2003 | O'Donnell et al. ............. 340/825.69 |
| 6,750,782 | B1 | * | 6/2004 | Byun ............................. 340/825.72 |
| 6,956,461 | B2 | * | 10/2005 | Yoon et al. ...................... 340/310.11 |
| 6,970,067 | B1 | * | 11/2005 | Sinke et al. ..................... 340/5.65 |
| 7,012,503 | B2 | * | 3/2006 | Nielsen .......................... 340/5.6 |
| 7,111,320 | B1 | * | 9/2006 | Novak ........................... 725/139 |
| 2002/0070960 | A1 | * | 6/2002 | Maine et al. .................... 345/723 |

FOREIGN PATENT DOCUMENTS

| JP | 2003-127833 | 5/2003 |
| JP | 2003-127928 | 5/2003 |
| JP | 2003-127952 | 5/2003 |
| TW | 327476 | 5/1982 |
| TW | 588007 | 5/2004 |

* cited by examiner

*Primary Examiner* — Nam V Nguyen
(74) *Attorney, Agent, or Firm* — Stevens Law Group; David R. Stevens

(57) ABSTRACT

A remote controller for controlling a selected electric appliance includes a code input interface for inputting an control identification code of the selected electric appliance, a instruction input interface for inputting a function instruction for controlling the operation of the electric appliance, a wireless transmission module for outputting wireless signals, and a control module for controlling the wireless transmission module to output a corresponding control identification code signal after the code input interface receives the control identification code of the electric appliance, and the control module also for controlling the wireless transmission module to output a corresponding function instruction signal after the instruction input interface receives the function instruction.

3 Claims, 4 Drawing Sheets

REMOTE CONTROLLER CAPABLE OF SELECTIVELY CONTROLLING A PLURALITY OF ELECTRIC APPLIANCES, REMOTE CONTROL SYSTEM AND METHOD THEREOF

BACKGROUND OF INVENTION

1. Field of the Invention

The present invention relates to a remote controller capable of selectively controlling a plurality of electric appliances, remote control system and method thereof. More particularly, this invention relates to a remote controller, remote control system and method thereof for transmitting a wireless signal corresponding to an identification code to a plurality of electric appliances to lock the electric appliance corresponding to the identification code, and for transmitting a wireless signal corresponding to a function instruction to a plurality of electric appliances to control the locked appliance to execute the function instruction of the remote controller, remote control system and method thereof.

2. Description of the Prior Art

A remote controller has become part of our daily life and it has become an essential electric appliance. A user can select television channels or control an air conditioner through the remote controller without needing to move around. Please refer to FIG. 1. FIG. 1 refers to a functional block diagram of a conventional remote controller 10. The remote controller 10 comprises an input interface 12, comprising a plurality of keys for selecting functions corresponding to the key; a control module 14, coupled to the input interface 12, and an infrared light-emitting diode (infrared LED) 16, coupled to the control module 14. The user is able to select the function corresponding to the key, and the input interface 12 is capable of transmitting an input signal corresponding to the key to the control module 14. The control module 14 is capable of controlling the infrared LED 16 to output an infrared signal to an electric appliance by transmitting a control signal corresponding to the input signal to the infrared LED, much like a Morse code. After the electric appliance receives the infrared signal, the infrared signal will be decoded, and the corresponding function such as adjusting volume or image settings is then executed.

When the infrared LED 16 outputs an infrared signal, the infrared signal includes the corresponding function code of the function, a machine identification code which is positioned before the function code, for identifying which appliance will be controlled, and an ending code positioned after the function code to separate continuous signals. In the above-mentioned, the conventional remote controller 10 is capable of controlling a certain model of an electric appliance. However, if the user utilizes the remote controller 10 to control one of the electric appliances and there are other electric appliances of the same model within the signal range of the remote controller 10, then the rest of the electric appliances will also receive the infrared signal transmitted by the remote controller 10 and will perform the same function. The unintentional control of appliances results in an error and causes inconvenience to the user. Therefore, to avoid this error each infrared signal transmitted will include the machine identification code, the function code, and the ending code. This is an added complication in control command and also causes a delay in decoding the infrared signal; hence this causes a delay in the reaction time for the electric appliance to perform the command of the remote controller 10.

SUMMARY OF INVENTION

The claimed invention relates to a remote controller capable of selectively controlling a plurality of electrical appliances, a remote control system and a method thereof. A wireless signal corresponding to a control identification code is selectively transmitted to a plurality of electrical appliances to lock the electric appliance corresponding to the identification code, and a wireless signal corresponding to a function instruction is transmitted to a plurality of electric appliances to control the locked electric appliance to execute the corresponding function instruction. Therefore the claimed invention solves the problem mentioned above.

One embodiment of the claimed invention is a remote controller for controlling a selected electric appliance, the remote controller comprising: a code input interface for inputting a control identification code of the selected electric appliance; an instruction input interface for inputting a function instruction for controlling the operation of the electric appliance; a wireless transmission module for outputting a wireless signal; and a control module for controlling the wireless transmission module to output a corresponding control identification code signal after the code input interface receives the control identification code of the electric appliance, and the control module for controlling the wireless transmission module to output a corresponding function instruction signal after the instruction input interface receives a function instruction.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
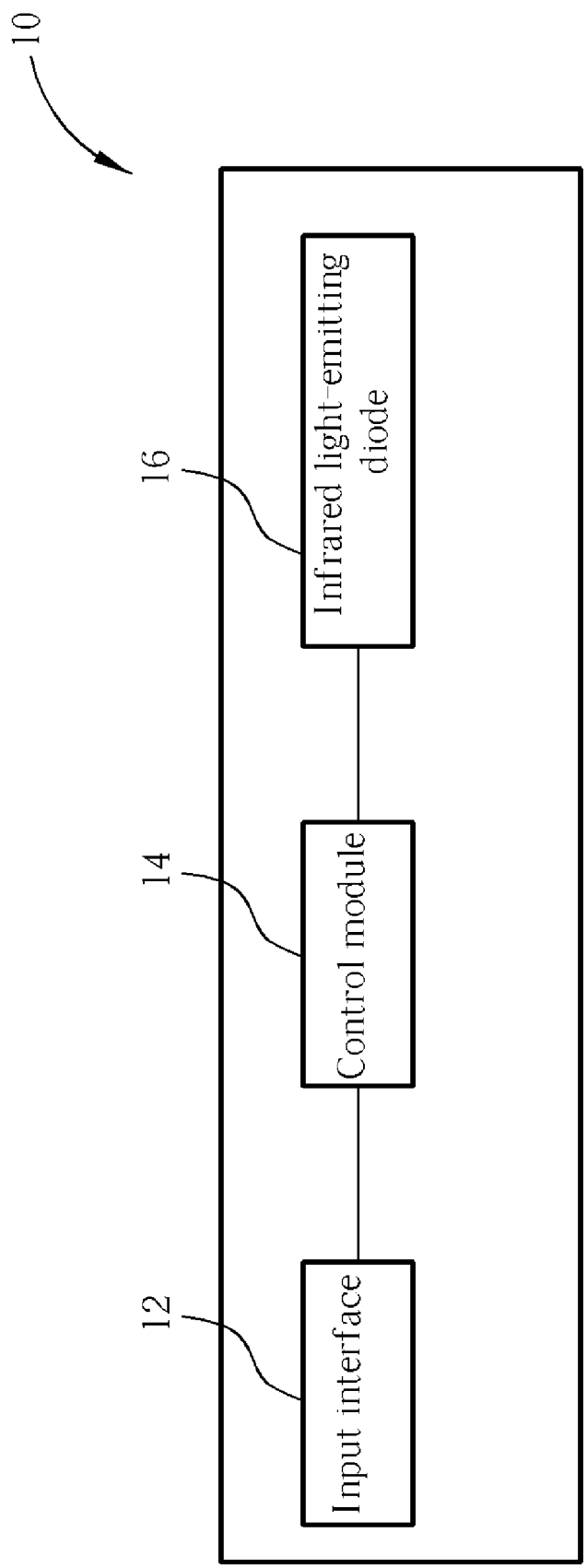
FIG. 1 refers to a functional block diagram of a conventional remote controller.
Figure 2:
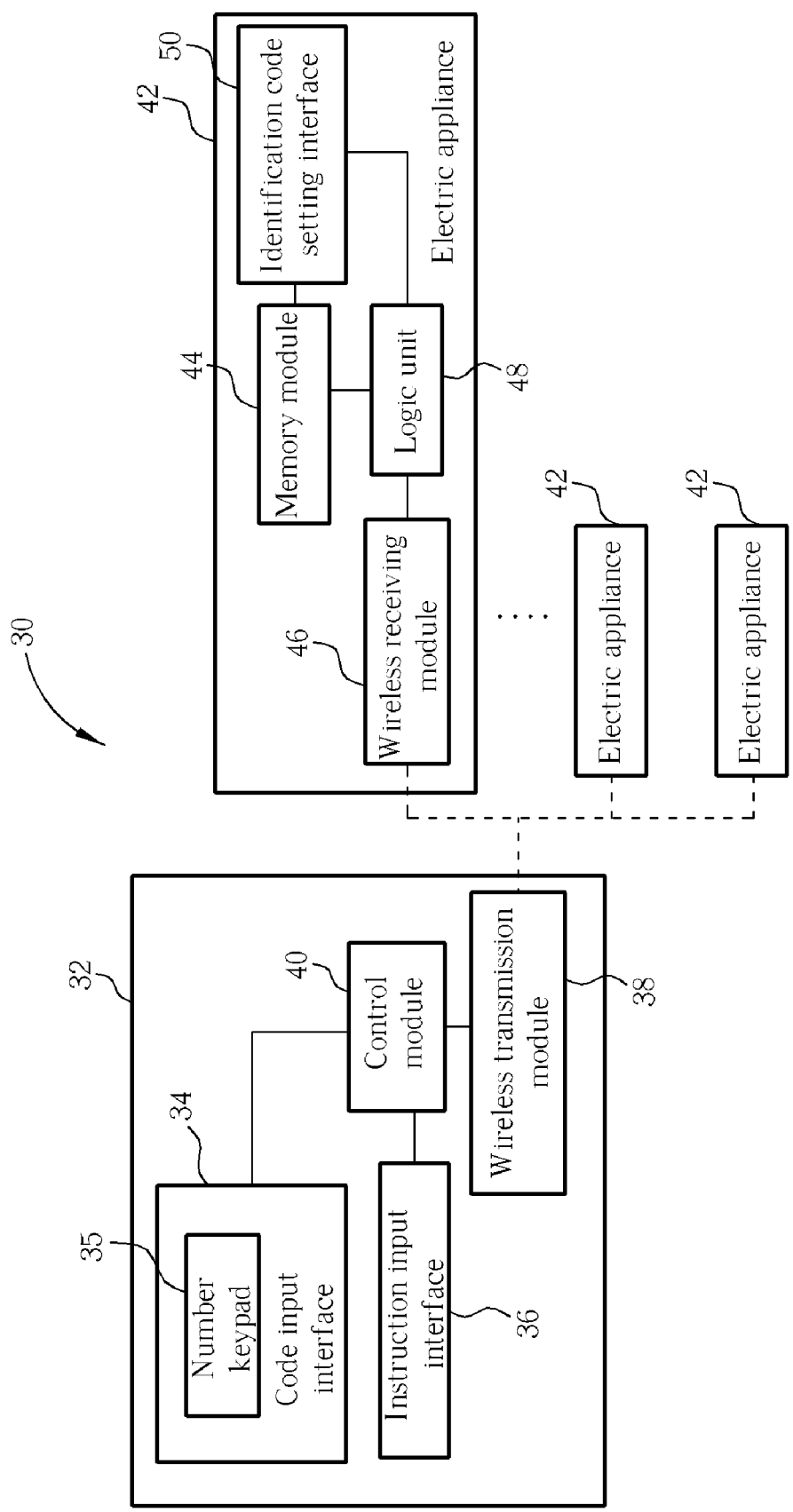
FIG. 2 illustrates a functional block diagram of a remote control system according to the present invention.

Please refer to FIG. 2. FIG. 2 illustrates a functional block diagram of a remote control system 30 according to the present invention. The remote control system comprises a remote controller 32 capable of selectively controlling a plurality of electric appliances. The remote controller 32 comprises a code input interface 34 for inputting a control identification code of the selected electric appliance 42 (the code input interface 34 may further comprise a number keypad 35 for inputting the control identification code of the electric appliance 42); an instruction input interface 36 for inputting a function instruction for controlling the operation of the electric appliance 42; a wireless transmission module 38 for outputting a wireless signal; and a control module 40 for controlling the wireless transmission module 38 to output a corresponding control identification code signal after the code input interface 34 receives a control identification code of the electric appliance 42, and the control module 40 also for controlling the wireless transmission module 38 to output a corresponding function instruction signal after the instruction input interface 36 receives a function instruction for controlling the operation of the electric appliance 42. The remote control system further comprises at least an electric appliance 42. Each electric appliance 42 comprises a memory module 44 for storing an appliance identification code corresponding to the electric appliance 42, which can be an electrically erasable programmable read only memory (EEPROM); a wireless receiving module 46 for receiving the control identification code signal or the function instruction signal transmitted from the wireless transmission module 38 of the remote controller 32; a logic unit 48 for setting the electric appliance 42 as a lock status after the control identification code signal received by the wireless receiving module 46 matches the appliance identification code stored in the memory module 44, and the logic unit 48 also for controlling the electric appliance 42 to execute the function instruction after the electric appliance 42 is set as the lock status and the wireless receiving module 46 receives the function instruction signal; and an identification code setting interface 50 for displaying, setting, or changing the appliance identification code stored in the memory module 44 of the electric appliance 42.

Figure 3:
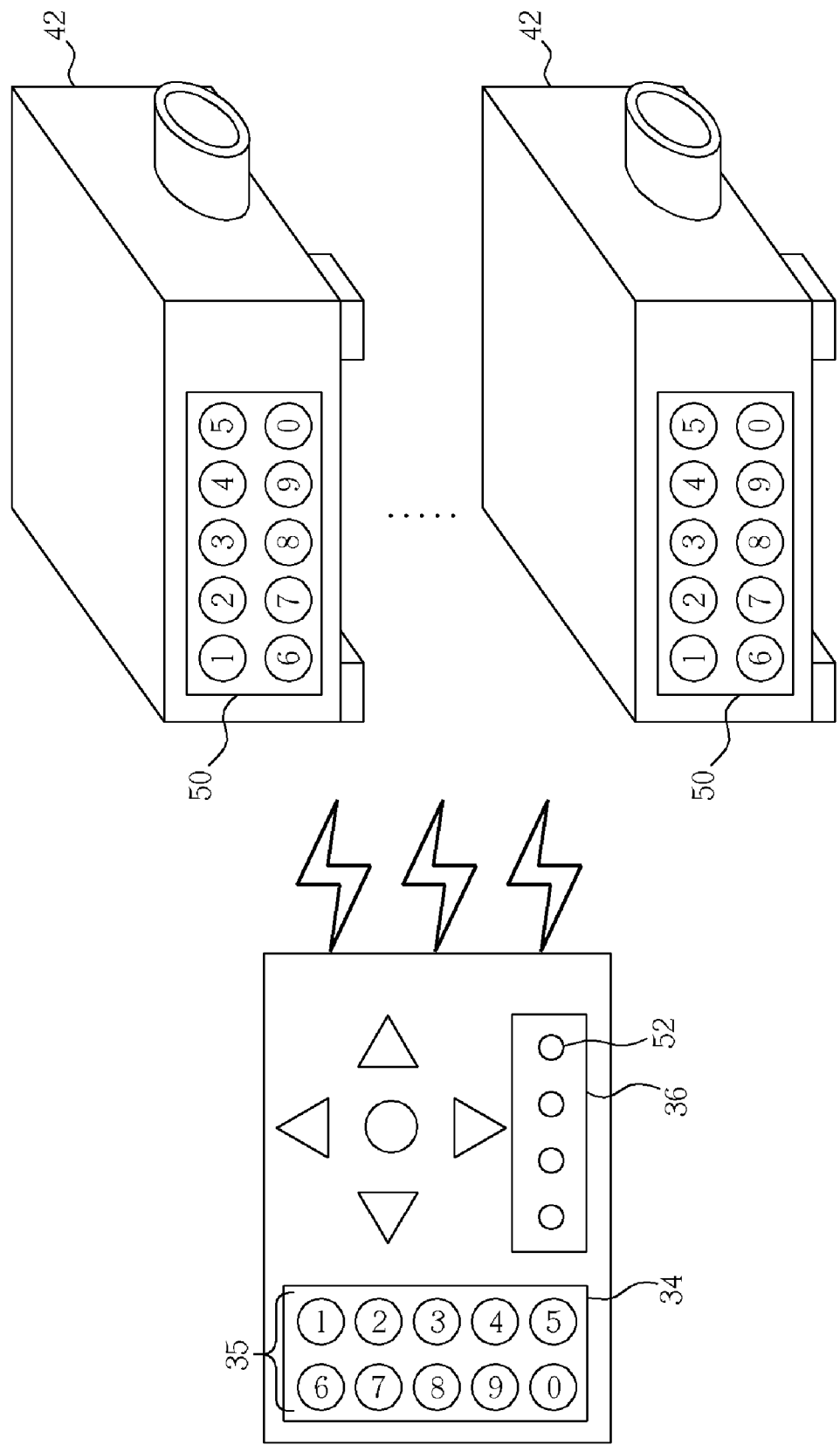
FIG. 3 illustrates a diagram of a remote controller controlling a plurality of electric appliances.

Please refer to FIG. 3. FIG. 3 illustrates a diagram of a remote controller 32 controlling a plurality of electric appliances. The electric appliance can be a projector or other types of home electric appliances that can be remotely controlled. A user is able to set the appliance identification code of the electric appliance 42 through an identification code setting interface 50 of the electric appliance 42 and the identification code setting interface 50 of the electric appliance 42 can be a human-machine interface such as a keypad or a touch screen. The identification code setting interface 50 may further provide a function of on screen display (OSD). The appliance identification code of each electric appliance 42 can be set to differentiate its individual control; or some of the appliance identification codes can be set as the same for several appliances so as to form a group. For example, the appliance identification code of three electric appliances 42 can be set as "1", while the appliance identification code of other four electric appliances 42 can be set as "2". Therefore at the same time the user can control three electric appliances 42 with the appliance identification code "1" or four electric appliances 42 with the appliance identification code "2". Utilizing the remote controller 32, the user can input the control identification code of the selected electric appliance 42 through a code input interface 34 and the control identification code can be inputted through a number keypad 35. In the actual operation, the control identification code and the appliance identification code can be any identifiable symbol, such the number 1, 2, 3, etc. or the alphabet a, b, c, etc. The code input interface 34 for inputting the control identification code and the identification code setting interface 50 for setting the appliance identification code are not limited to the type of the keypad, other types of the human-machine interfaces can be utilized as well. Furthermore, the user can input a function instruction for controlling the operation of the electric appliance 42 through an instruction input interface 36, for example, adjusting each function of the electric appliance 42. The instruction input interface 36 may comprise a release button 52 for releasing the lock status of the locked electric appliance 42.

Figure 4:
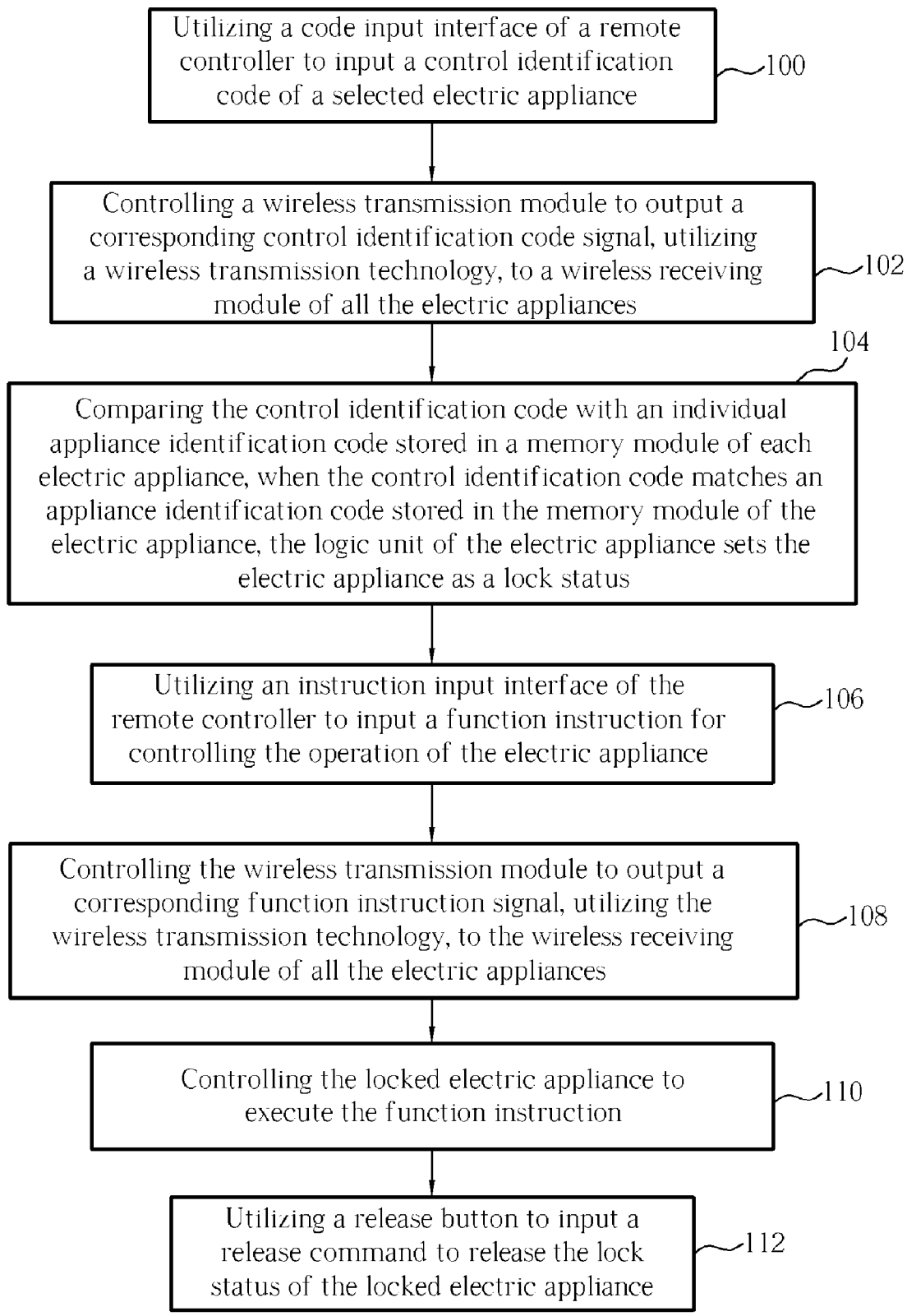
FIG. 4 illustrates a flowchart of a remote controller capable of selectively controlling a plurality of electric appliances in a remote control system.

Please refer to FIG. 4. FIG. 4 illustrates a flowchart of a remote controller capable of selectively controlling a plurality of electric appliances 42 in a remote control system 30. The method comprising the following steps:

Step 100: Utilizing a code input interface 34 of a remote controller 32 to input a control identification code of a selected electric appliance 42.

Step 102: Controlling a wireless transmission module 38 to output a corresponding control identification code signal, utilizing a wireless transmission technology, to a wireless receiving module 46 of all the electric appliances 42.

Step 104: Comparing the control identification code with an individual appliance identification code stored in a memory module 44 of each electric appliance 42, when the control identification code matches an appliance identification code stored in the memory module 44 of the electric appliance 42, the logic unit 48 of the electric appliance 42 sets the electric appliance 42 as a lock status.

Step 106: Utilizing an instruction input interface 36 of the remote controller 32 to input a function instruction for controlling the operation of the electric appliance 42.

Step 108: Controlling the wireless transmission module 38 to output a corresponding function instruction signal, utilizing the wireless transmission technology, to the wireless receiving module 46 of all the electric appliances 42.

Step 110: Controlling the locked electric appliance 42 to execute the function instruction.

Step 112: Utilizing a release button 52 to input a release command to release the lock status of the locked electric appliance.

The above-mentioned will be further explained. The user first sets the appliance identification code of each electric appliance 42 utilizing the identification code setting interface 50 of the electric appliance 42. The setting of appliance identification codes of each electrical appliance 42 may be different. For example, if there are ten electric appliances 42 and each is set as follows: 0, 1, . . . , 8, and 9, then ten groups of appliance identification codes assigned to ten electric appliances respectively differentiate each individual electric appliance 42. Or set the same appliance identification code for some of the electric appliances 42 to form a group. For example, if the appliance identification codes of three electric appliances 42 are set as "1", and the appliance identification codes of other four electric appliances 42 are set as "2". Therefore at the same time the user can control 3 electric appliances 42 with the appliance identification code "1" or control four electric appliances 42 with the appliance identification code "2". After the setting of appliance identification codes is finished, the user is able to input the control identification code through the code input interface 34 of the remote controller 32 to select the electric appliance 42 which will be controlled. For example, if the user press the number key "1" of the number keypad 35 of the code input interface 34, it means that the user has selected to control the electric appliance 42 with the appliance identification code "1". After the control module 40 of the remote controller 32 received the control identification code signal transmitted from the code input interface 34, the control module 40 will control the wireless transmission module 38 to output a corresponding wireless signal of the control identification code, utilizing a wireless transmission technology, to a wireless receiving module 46 of all the electric appliances 42. The wireless transmission module 38 may utilize infrared transmission technology or Bluetooth technology of a wireless network protocol to transmit wireless signal to the wireless receiving module 46. In the above-mentioned example, the control module 40 will control the wireless transmission module 38 to output a corresponding wireless signal of the control identification code "1" to the wireless receiving module 46 of all the electric appliances 42. After the wireless receiving module 46 of each electric appliance 42 received the corresponding wireless signal of the control identification code "1" transmitted from the wireless transmission module 38 of the remote controller 32, the logic unit 48 of each electric appliance 42 compares the control identification code "1" with the individual appliance identification code stored in a memory module 44 of each electric appliance 42. When the control identification code "1" matches an appliance identification code stored in the memory module 44 of the electric appliance 42, the logic unit 48 of the electric appliance 42 will set the electric appliance 42 as a lock status. The locked electric appliance 42 will then execute the function instruction transmitted from the remote control 32.

Next, the user utilizes the instruction input interface 36 of the remote controller 32 to input a function instruction for controlling the operation of the locked electric appliance 42, such as inputting each operation parameter of the locked electric appliance 42. After the control module 40 of each electric appliance 42 received the function instruction transmitted from the instruction input interface 36, the control module 40 of the remote controller 32 will control the wireless transmission module 38 to output a corresponding function instruction signal, utilizing the wireless transmission technology, to the wireless receiving module 46 of all the electric appliances 42. Although all the wireless receiving module 46 of each electric appliance 42 receives the function instruction signal transmitted from the wireless transmission module 38 of the remote controller 32, only the logic unit 48 of the locked electric appliance 42 will control the locked electric appliance 42 to execute the function instruction. In the above-mentioned example, only the logic unit 48 of the electric appliance 42 with the appliance identification code "1" will control the electric appliance 42 to execute the function instruction, and the electric appliance 42 with other appliance identification code which receives the function instruction signal will not have any corresponding action.

Lastly, if the user wants to release the locked status of the electric appliance 42 to end the control of the locked electric appliance 42 or wants to control other electric appliance 42 instead, the user is able to press the release button 52 to input a release command. After the control module 40 of the remote controller 32 receives the release command from the release button 52, the control module 40 of the remote controller 32 will control the wireless transmission module 38 to output a corresponding release command signal, utilizing the wireless transmission technology, to the wireless receiving module 46 of the electric appliances 42. The login unit 48 of the locked electric appliance 42 will then release the lock status so that the electric appliance 42 will not be controlled by the remote controller 32. At this time, the control identification code of a new electric appliance 42 can be re-selected and step 100 to step 112 will be repeated. For example, when the user utilizes the number keypad 35 of the code input interface 34 to input a control identification code "1" and a control identification code "3" in sequence, all the electric appliances 42 with the appliance identification code "1" or the appliance identification code "3" will be set as the lock status. Next, the user is able to utilize the instruction input interface 36 of the remote controller 32 to control all the electric appliances 42 with the appliance identification code "1" or the appliance identification code "3" to execute the related functions. If the user later on presses the release button 52 to input a release command, at the same time the locked status of the electric appliances 42 with the identification code 1 or the identification code 3 will be released and be reset as the un-locked status.

Regarding the method of releasing the locked status of the electric appliance 42, other than utilizing the method mentioned above to release all the locked electric appliances 42, the remote control system 30 can alternately be designed as follows. When the user first utilizes the code input interface 34 to input the control identification code of the selected electric appliance 42, the control identification code is utilized to lock the electric appliance 42 with a appliance identification code corresponding to the control identification code. When the user utilizes the code input interface 34 again to input the same control identification code as the first input, the control identification code is then utilized to release the locked status of the electric appliance 42 with the appliance identification code corresponding to the control identification code. That is, the control identification code which is inputted in the odd order is utilized to lock the electric appliance 42 with a appliance identification code corresponding to the control identification code, and the same control identification code which is inputted in the even order is utilized to release the locked status of the electric appliance 42 with the appliance identification code corresponding to the control identification code. Hence, the remote controller 32 can be utilized to select a certain number of electric appliances 42 in sequence to control the locked electric appliances 42 with different appliance identification codes simultaneously, and to release the lock status of a certain number of electric appliances 42 in sequence. For example, when the user first utilizes the number keypad 35 of the code input interface 34 to input the control identification code "1" and the control appliance identification "3" in sequence, and the electric appliances 42 with a appliance identification code corresponding to the control identification code "1" or the control appliance identification "3" will be set as the lock status. The user then is able to utilize the instruction input interface 36 of the remote controller 32 to control the electric appliances 42 with the appliance identification code corresponding to the control identification code "1" or the control appliance identification "3" to execute the related functions simultaneously. And if the user only wants to control the electric appliance 42 with the appliance identification code corresponding to the appliance identification code "3" but not the electric appliance 42 with the appliance identification code corresponding to the appliance identification code "1", the user is able to press the number key "1" of the number keypad 35 to input the control identification code 1 signal again, and the locked status of the electric appliance 42 corresponding to the appliance identification code "1" will be released. Therefore the user is able to utilize the instruction input interface 36 of the remote controller 32 to merely control the electric appliance 42 corresponding to the appliance identification code "3" to execute the related functions.

In comparison with the prior art, the remote controller of the present invention first transmits a wireless signal corresponding to the control identification code to the selected electric appliance to lock the electric appliance corresponding to the control identification code. The wireless signal corresponding to the function instruction is then transmitted to the selected electric appliance to control the locked electric appliance to execute the function instruction. Hence the user is able to control a plurality of electric appliances selectively and will not control other electric appliances of the same model, as this will cause malfunction and inconvenience. Furthermore, the remote controller of this invention will only transmit the control identification code signal or the function instruction signal to the selected electric appliance. Thus the control command of the remote controller for controlling the electric appliance can be simplified and accordingly the reaction time of the remote control can be shorten. The present invention overcomes the drawbacks of the prior art which the wireless signal must include the machines identification code, the function code and the ending code that causes a complication in control command and also a delay in reaction time of the remote control. Therefore the remote controller of the present invention does not require the inclusion of all the machine identification codes, the function code, and the ending code in each wireless signal. The present invention only requires the user to set the appliance identification code in the electric appliance, and then to input the control identification code in the code input interface of the remote controller so that the wireless signal corresponding to the specific control identification code can be transmitted to control the electric appliance with a appliance identification code corresponding to that specific control identification code. The user can select to input the identification code corresponding to the selected electric appliance to transmit the wireless signal corresponding to the control identification code. The remote controller itself does not need additional memory to store the identification code of the electric appliance, and thus the cost of the remote controller can be reduced. In addition to releasing the locked electric appliance simultaneously, the present invention is also capable of releasing the locked electric appliance corresponding to the specific control identification code in sequence. The present invention has the flexibility to lock a plurality of electric appliances simultaneously or in sequence, to control a plurality of electric appliances simultaneously, and to release a plurality of electric appliances simultaneously or in sequence.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A remote controller for controlling a selected electric appliance, the remote controller comprising:
   a code input interface for a user to input a control identification code of the selected electric appliance;
   an instruction input interface for inputting a function instruction for controlling the operation of the electric appliance if the control identification code matches an appliance identification code corresponding to the electric appliance, the appliance identification code being assignable by the user;
   a wireless transmission module for outputting wireless signals; and
   a control module for controlling the wireless transmission module to output a corresponding control identification code signal after the code input interface receives the control identification code of the electric appliance, and the control module also for controlling the wireless transmission module to output a corresponding function instruction signal, independent of the control identification code signal, after the instruction input interface receives the function instruction, wherein the control module is configured to control the wireless transmission module to output the corresponding control identification code signal to the electrical appliance to set the electric appliance corresponding to the control identification code as a lock status, and the control module is also capable of controlling the wireless transmission module to output the corresponding function instruction signal to the electric appliance to control the locked electric appliance to execute the function instruction;
   wherein the control module is configured to control the wireless transmission module to output the corresponding control identification code signal to the electrical appliance to set the electric appliance corresponding to the control identification code as a lock status, and the control module is also capable of controlling the wireless transmission module to output the corresponding function instruction signal to the electric appliance to control the locked electric appliance to execute the function instruction;
   wherein the code input interface is configured to receive another input of the control identification code of the electric appliance, and wherein the control module is configured to control the wireless transmission module to output the corresponding control identification code signal to the electric appliance to release the lock status of the electric appliance corresponding to the control identification code.

2. A remote controller for controlling a first selected electric appliance and a second selected electric appliance, the remote controller comprising:
   a code input interface for a user to input a first control identification code of the first selected electric appliance and a second control identification code of the second selected electric appliance;
   an instruction input interface for inputting a function instruction for controlling the operation of the first and second electric appliances if the first and second control identification codes match a first appliance identification code and a second appliance identification code, respectively, wherein the first and second appliance identification codes are assignable by the user;
   a wireless transmission module for outputting wireless signals; and
   a control module for controlling the wireless transmission module to output corresponding first and second control identification code signals after the code input interface receives the first and second control identification codes, and the control module also for controlling the wireless transmission module to output a corresponding function instruction signal, independent of the control identification code signals, after the instruction input interface receives the function instruction, wherein the control module is configured to control the wireless transmission module to output the corresponding first and second control identification code signals to the first and second electrical appliances, respectively, to set the first and second electric appliances corresponding to the first and second control identification codes in a lock status, and wherein the control module is also capable of controlling the wireless transmission module to output the corresponding function instruction signal to the first and second electric appliances to control the locked electric appliances to execute the function instruction;
   wherein the control module is configured to control the wireless transmission module to output the corresponding first and second control identification code signals to the first and second electrical appliances, respectively, to set the first and second electric appliances corresponding to the first and second control identification codes in a lock status, and wherein the control module is also capable of controlling the wireless transmission module to output the corresponding function instruction signal to the first and second electric appliances to control the locked electric appliances to execute the function instruction;
   wherein the code input interface is configured to receive another input of the first control identification code of the first electric appliance, and wherein the control module is configured to control the wireless transmission module to output the corresponding first control identification code signal to the first electric appliances to release the lock status of the first electric appliance while maintaining the lock status of the second electric appliance.

3. A remote controller for controlling a first selected electric appliance and a second selected electric appliance, the remote controller comprising:

a code input interface for a user to input a first control identification code of the first selected electric appliance and a second control identification code of the second selected electric appliance;

an instruction input interface for inputting a function instruction for controlling the operation of the first and second electric appliances if the first and second control identification codes match a first appliance identification code and a second appliance identification code, respectively, wherein the first and second appliance identification codes are assignable by the user;

a wireless transmission module for outputting wireless signals; and a control module for controlling the wireless transmission module to output corresponding first and second control identification code signals after the code input interface receives the first and second control identification codes, and the control module also for controlling the wireless transmission module to output a corresponding function instruction signal, independent of the control identification code signals, after the instruction input interface receives the function instruction, wherein the control module is configured to control the wireless transmission module to output the corresponding first and second control identification code signals to the first and second electrical appliances, respectively, to set the first and second electric appliances corresponding to the first and second control identification codes in a lock status, and wherein the control module is also capable of controlling the wireless transmission module to output the corresponding function instruction signal to the first and second electric appliances to control the locked electric appliances to execute the function instruction;

wherein the code input interface is configured to receive another input of the first control identification code of the first electric appliance and the second control identification code of the second electric appliance, and wherein the control module is configured to control the wireless transmission module to output the corresponding first and second control identification code signals to the first and second electric appliances, respectively, to release the lock status of the electric appliances corresponding to the control identification codes.

\* \* \* \* \*